United States Patent [19]

Le Compagnon et al.

[11] Patent Number: 5,142,824
[45] Date of Patent: Sep. 1, 1992

[54] FOUR SIDE FLUSH SLIDING WINDOW ASSEMBLY

[75] Inventors: Gilles Le Compagnon, Dover; David A. Rose, Amherst, both of N.H.

[73] Assignee: Harvard Industries, The Kingston-Warren Corporation, Newfields, N.H.

[21] Appl. No.: 764,002

[22] Filed: Sep. 23, 1991

[51] Int. Cl.$^5$ ............................................. E05F 15/08
[52] U.S. Cl. .................... 49/349; 49/138; 49/374
[58] Field of Search ............... 49/25, 138, 348, 349, 49/350, 352, 324, 374, 375

[56] References Cited

U.S. PATENT DOCUMENTS

| | | | |
|---|---|---|---|
| 2,615,711 | 10/1952 | Niquette | 49/349 X |
| 3,022,064 | 2/1962 | Russell | 49/349 X |
| 4,237,657 | 12/1980 | Kazewych | 49/352 |
| 4,454,688 | 6/1984 | Rest et al. | 49/502 |
| 4,567,691 | 2/1986 | Warner | 49/374 |
| 4,628,637 | 12/1986 | Okada et al. | 49/374 |
| 4,730,414 | 3/1988 | Nakamura et al. | 49/348 |
| 4,771,575 | 9/1988 | Tiesler | 49/211 |
| 4,788,794 | 12/1988 | Miller | 49/375 X |
| 4,998,379 | 3/1991 | Yamada et al. | 49/138 |
| 5,081,792 | 1/1992 | Huebner | 49/349 X |

FOREIGN PATENT DOCUMENTS

| | | | |
|---|---|---|---|
| 1951710 | 4/1971 | Fed. Rep. of Germany | 49/352 |
| 493522 | 10/1938 | United Kingdom | 49/349 |

Primary Examiner—Renee S. Luebke
Assistant Examiner—Jerry Redman
Attorney, Agent, or Firm—Lahive & Cockfield

[57] ABSTRACT

A sliding window assembly for moving a window between a cavity defined by a structure having an outer surface, and a space located above the cavity comprises a first motor for selectively moving the window between the cavity and the space and a second motor for selectively moving the window between a first position substantially aligned with the cavity and a second position substantially aligned with the outer surface. First sensors indicate when the window is substantially entirely within the cavity and when the window is substantially entirely within the space. Second sensors indicate when the window is in the first position and when the window is in the second position. In one embodiment of the invention, third sensors indicate when the window is positioned for the second motor to move the window between the first and second positions. A programmable logic controller is connected to the sensors for appropriately controlling the motors.

12 Claims, 8 Drawing Sheets

FOUR SIDE FLUSH SLIDING WINDOW ASSEMBLY

BACKGROUND OF THE INVENTION

The invention generally relates to the field of a sliding window assemblies for use in the automotive industry. In particular, the invention concerns a sliding window assembly for positioning a window substantially flush with the exterior surface of a motor vehicle.

As performance efficiency has become more and more important with motor vehicles, considerable attention has been focused on improving the aerodynamic features of the vehicle body. Studies have shown that a substantial amount of the resistance, or drag, on a moving vehicle is due to the vehicle windows being recessed in the sides of the vehicle body. These recesses in the otherwise smooth surface of the vehicle body create circular air currents, or eddies, which degrade the aerodynamic properties of the vehicle.

Additionally, consumer preferences indicate that it is aesthetically desirable for windows to be flush with the exterior surfaces of motor vehicles. Moreover, consumers also prefer flush windows because they eliminate wind noise inside the vehicle such as are caused by the above-described air currents.

Accordingly, there have been attempts to improve automobile aerodynamics and aesthetics by mounting vehicle windows more or less flush with the exterior surface of the vehicle body. While this is relatively simple to do in the case of fixed windows, it is difficult to achieve in the case of sliding windows. Some progress has been made in this area, however, by properly contouring the guides or tracks in which a window slides so that as the window is raised, it moves outwardly toward the exterior surface of the vehicle body. Such a system is disclosed in U.S. Pat. No. 4,561,211. Other window-door assemblies such as those disclosed in U.S. Pat. Nos. 4,454,688, 4,567,691, and 4,628,637 provide a somewhat flush mounted window by offsetting the window pane outwardly with respect to the track in which the window travels.

Another type of assembly includes a carriage which carries the window assembly and is supported by a linkage such that the carriage is shiftable. Such a system is described in U.S. Pat. No. 4,730,414 to Nakamora et al. and U.S. Pat. No. 4,771,575 to Tiesler. In both of these assemblies, vertically applied forces act on the linkage to cause a shifting of the window carrying carriage.

None of the known assemblies, however, has provided a completely satisfactory approach to providing a sliding window assembly which positions the window flush on all four sides with respect to the outer surface of the motor vehicle. While somewhat effective in various aspects, the known systems have been unable to achieve a completely flush window. Tests have shown, however, that even a relatively small amount of setback along an edge margin of the closed window can create appreciable drag and considerable wind noise inside a motor vehicle.

It is an object of the invention, therefore, to provide a sliding window assembly which positions the closed window completely flush with the motor vehicle body on all four sides of the window.

SUMMARY OF THE INVENTION

This and other objects are achieved by the present invention which features a sliding window assembly for moving a window between a cavity defined by a structure, such as a motor vehicle body, having an outer surface and a space located above the cavity, such as a window opening. The assembly includes a first motor for selectively moving the window between the cavity and the space and a second motor for selectively moving the window between a first position which is substantially aligned with the cavity and a second position which is substantially aligned with the outer surface.

The assembly further includes sensing means for indicating the position of the window. First sensing means indicates when the window is substantially entirely within the cavity and when the window is substantially entirely within the space. Second sensing means indicates when the window is substantially aligned with the cavity and when the window is substantially aligned with the outer surface.

In one embodiment, the invention features third sensing means for indicating when the window is selectively positioned for the second motor to move the window from alignment with the cavity to alignment with the outer surface In another embodiment, however, the window is merely extended upon the second sensing means indicating that the window is substantially entirely within the space. Logic means, such as a programmable logic controller, is provided for controlling the motors in response to signals generated by the sensing means.

In one embodiment, the detection means comprise pairs of capacitive proximity sensors, arranged for indicating the above-detailed positions of the window. Each sensor includes an electrode wired for communication with the programmable logic controller in response to the relative position of a corresponding target.

In another aspect, the invention features an L-shaped bracket which carries the window along its lower edge. The bracket is supported on a carriage. The first motor is coupled to the carriage for raising and lowering the carriage to position the window within the cavity, within the space, or at various positions therebetween. In this embodiment of the invention, the second motor is mounted on the carriage and coupled to the bracket so that the motor rides along with the window through the window's vertical path of travel.

In one embodiment, the programmable logic controller controls the motors through a series of motor speed controllers, such as rheostats. The rheostats present various resistances so that by routing current to the motors through selected rheostats, the programmable logic controller can control the speeds at which the motors move the window.

These and other features of the invention will be more readily apparent from the following detailed description which is to be read in conjunction with the attached drawings in which like reference numbers represent like elements throughout the several views.

BRIEF DESCRIPTION OF THE DRAWINGS

FIG. 3 is a schematic representation of the electrical wiring arrangement of the assembly shown in FIG. 1.

DETAILED DESCRIPTION

The invention features a four side flush sliding window assembly for moving a window between a cavity defined by a structure, such as an automobile door, having an outer surface, and a space located above the cavity, such as the window space defined by an automobile door. The assembly includes motors for raising and lowering the window and for withdrawing and extending the window so that the raised window can be arranged to be flush on all four sides with the outer surface of the automobile door.

Figure 1:
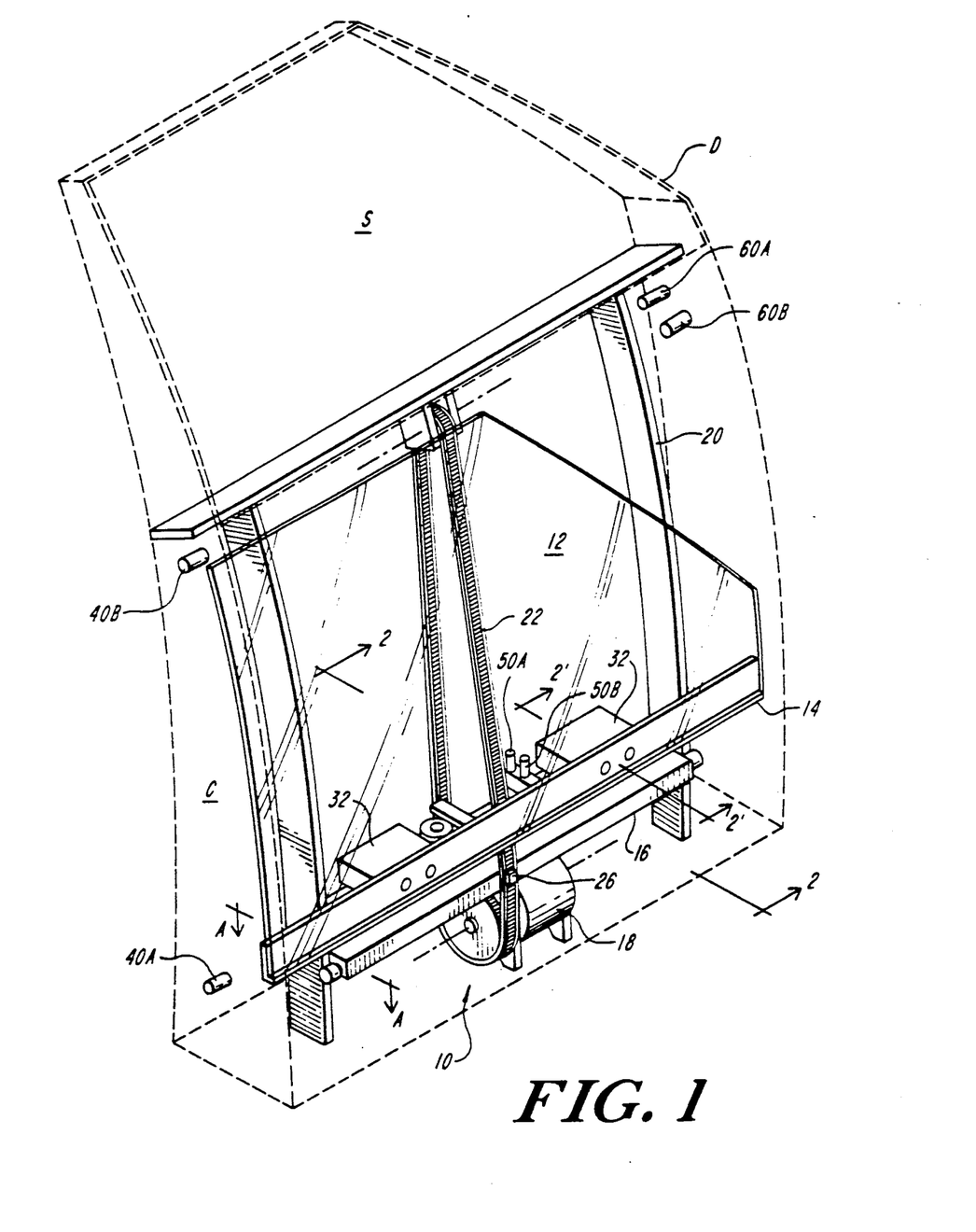
FIG. 1 is a schematic perspective view of a four side flush sliding window assembly constructed in accordance with the teachings of the present invention.

FIG. 1 shows an assembly 10 wherein a structure, such as a motor vehicle door D, is shown in phantom. A window 12 is disposed in its lowered position within a cavity C defined by the door D. The window 12 is supported by an L-shaped bracket 14 which itself is carried by a carriage 16. A motor 18 is mounted to the door D in the cavity C and is coupled to the carriage 16. As illustrated, the motor 18 is coupled to the carriage 16 via a belt or chain 22. Other coupling means will, however, be readily known to those skilled in the art.

Figures 1A, 7:
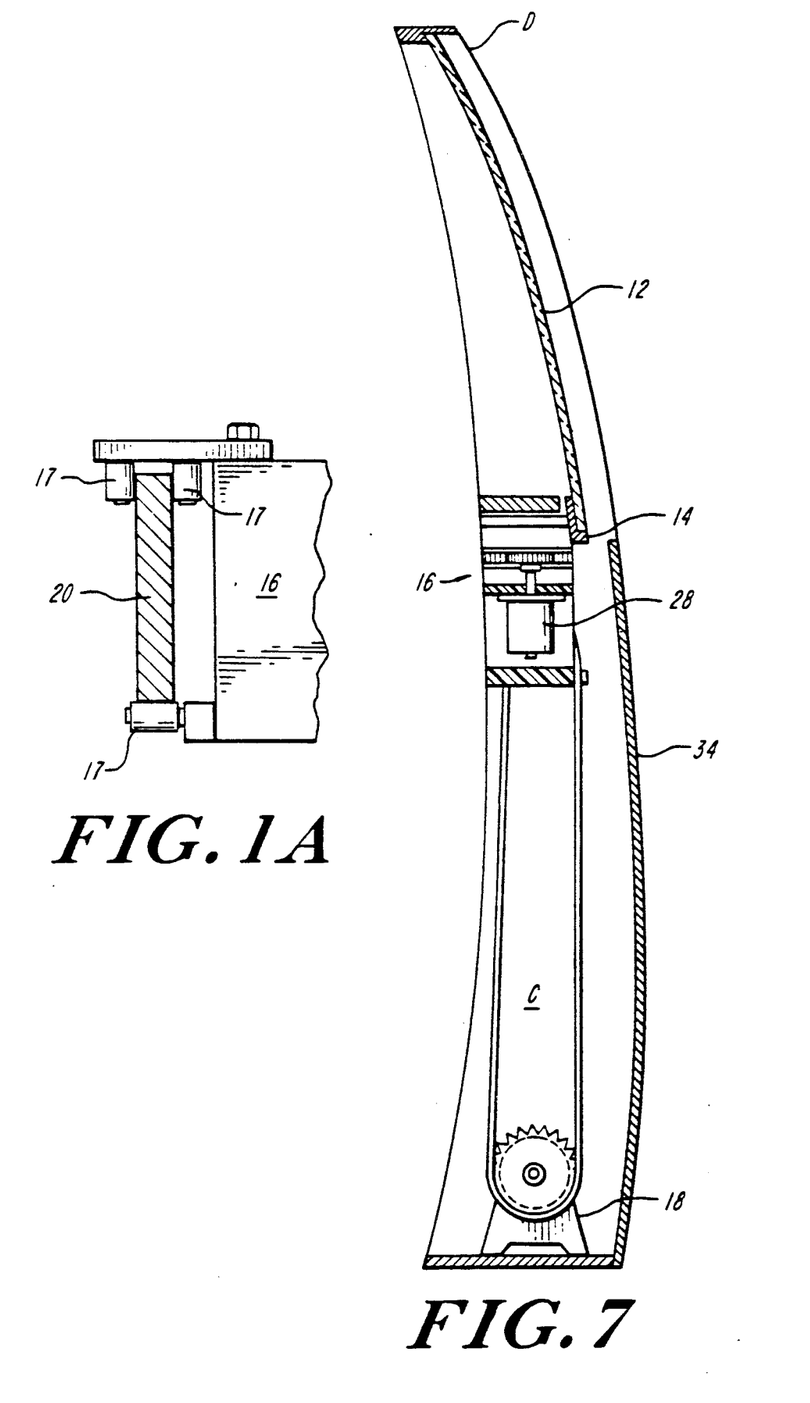
FIG. 1A is a sectional view taken along line A—A of FIG. 1.
FIG. 7 is a sectional view taken along line 7—7 of FIG. 6.

Vertical guides 20 are provided for guiding the carriage 16 along its vertical path as described in greater detail herein below. As shown in FIG. 1A, bearings 17 are connected to the carriage 16 for engaging the guides 20. Accordingly, the vertical travel of the carriage 16 is restricted to a path defined by the guides 20.

Two horizontal guides 32 are mounted on the carriage 16 and coupled to the bracket 14. As shown more clearly in FIG. 2, a second motor 28 is also mounted on the carriage 16. The motor 28 includes, for example, a sprocket 36 which engages a block gear 38. The bracket 14 is connected to the block gear 38 so that the bracket 14, and thus the window 12, can be horizontally displaced via the motor 28.

Figures 2, 5:
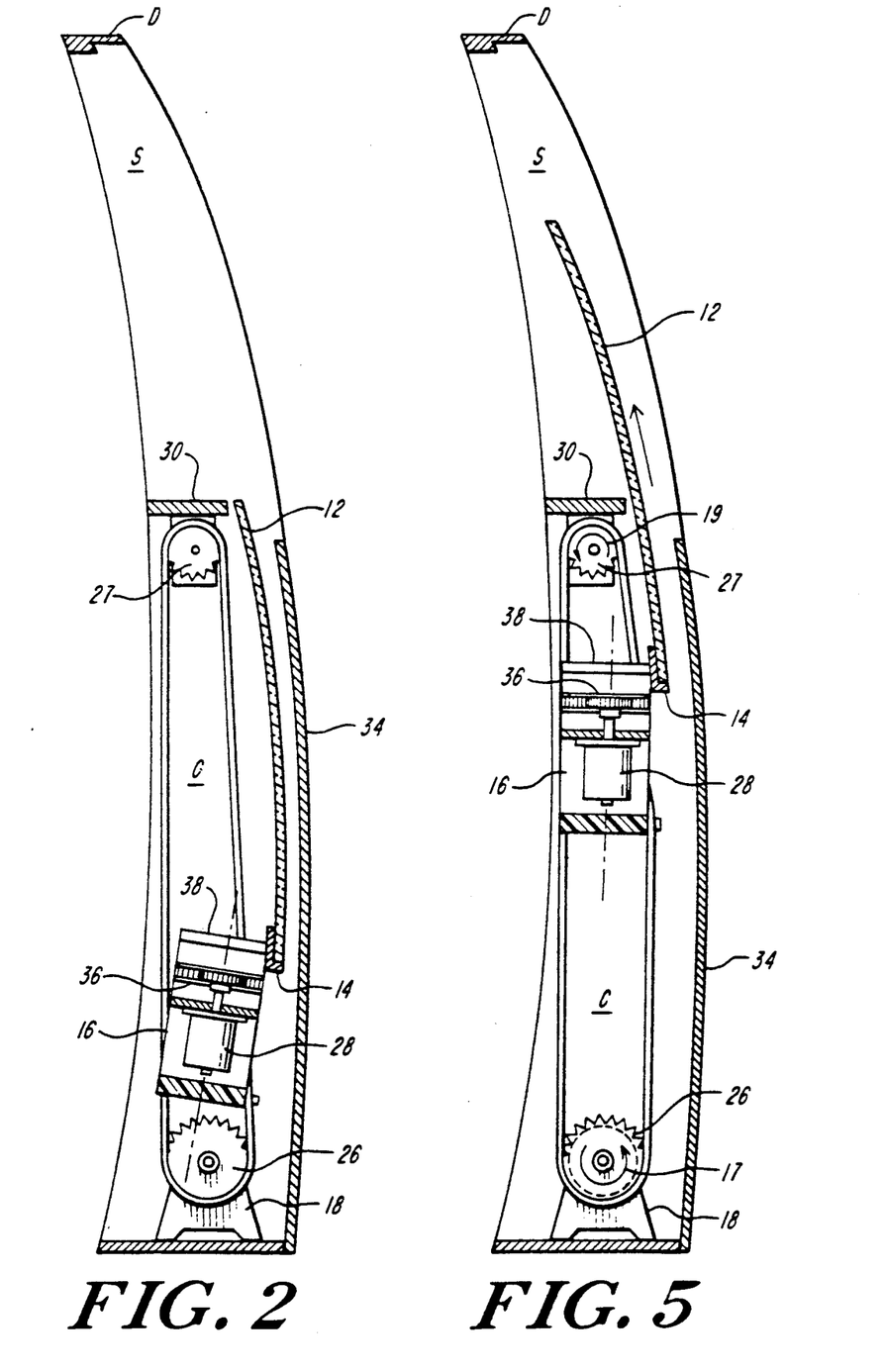
FIG. 2 is a sectional view taken along line 2—2 of FIG. 1, FIGS. 2A and 2B are sectional views taken along line 2'—2 of FIG. 1.
FIG. 5 is a sectional view taken along line 5—5 of FIG. 4.
Figures 2A, 2B, 3:
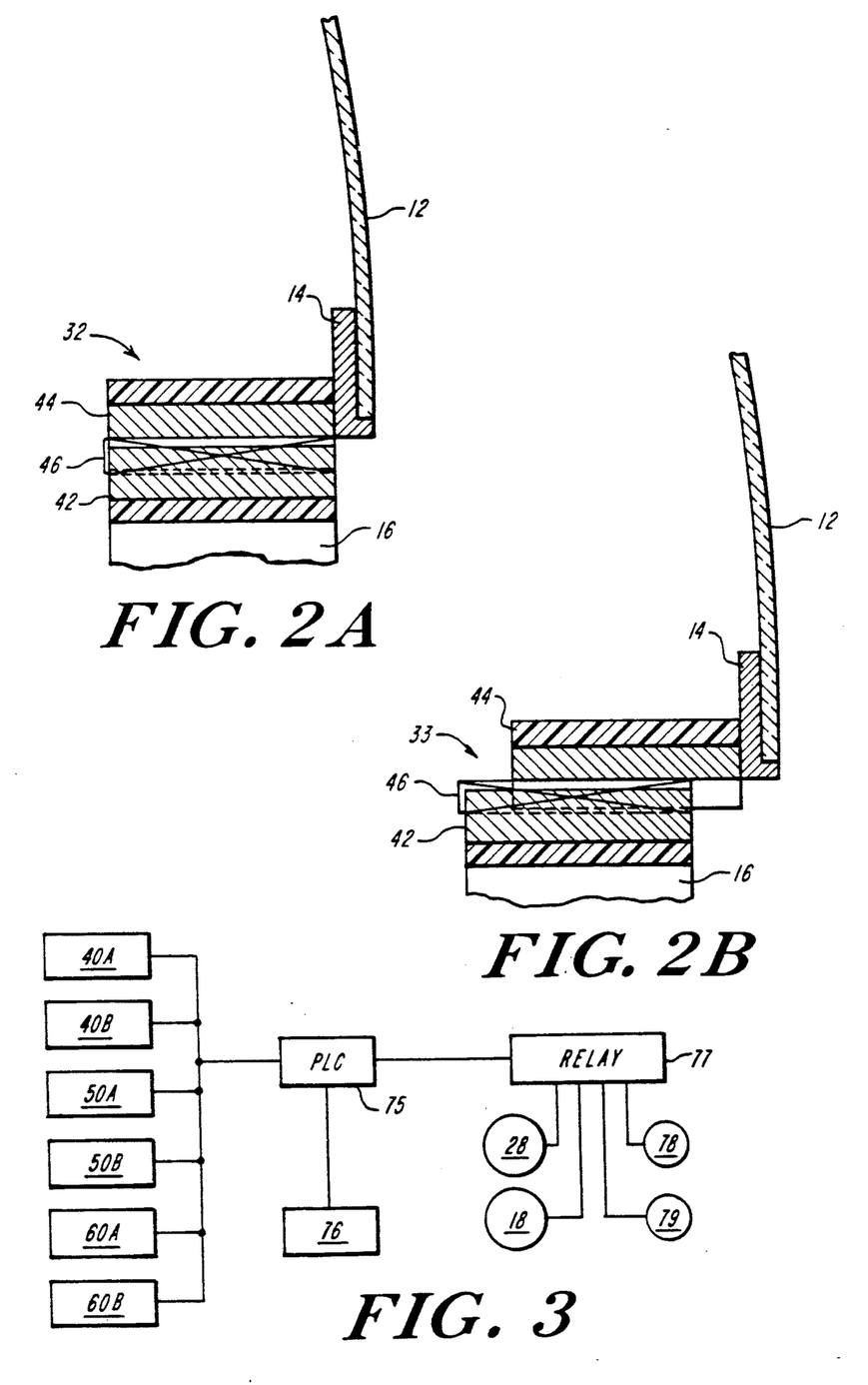

The horizontal guides 32 are more clearly visible in FIGS. 2A and 2B wherein it is shown that each guide includes a base portion 42 mounted to the carriage 16. The bracket 14 is fixed to a sliding portion 44 of the guide 32. A bearing, schematically illustrated at 46, allows the sliding portion 44 to reciprocate horizontally with respect to the base portion 42. This reciprocation is visible in FIG. 2B wherein the sliding portion 44 is extended so as to position the window 12 flush with the exterior surface 34 of the motor vehicle body. This motion is described in greater detail herein below.

The assembly further includes proximity sensors for indicating the position of the window. Various types of known sensors are suitable for use with the invention. For example, the illustrated assembly 10 utilizes capacitance proximity sensors, which include electrodes which change capacitance based on the relative positions of a target. Infrared and magnetic detectors can be used as well.

In any case, in the illustrated embodiment, the capacitance proximity sensors include electrodes 40A, 40B, 50A, 50B, 60A, and 60B. Electrode 40A is arranged for indicating when the window 12 is lowered to be substantially entirely within the cavity C and electrode 40B is arranged for indicating when the window 12 is raised to be substantially within the space S. Moreover, electrode 50A is arranged to indicate when the window is in its withdrawn position and electrode 50B is arranged to indicate when the window is in its extended position flush with the outer surface 34. Finally, in the illustrated embodiment, electrode 60A and 60B are arranged to indicate when the window is selectively positioned for the motor 28 either to move the window 12 from its withdrawn position as shown in FIG. 2A, to its extended, flush, position, as shown in FIG. 2B, or vice versa. This embodiment of the invention, therefore, is capable of beginning the extension/withdrawal cycle of the window 12, prior to the window 12 reaching the uppermost limit of travel path. As discussed below, however, the assembly can be constructed without electrodes 60A and 60B.

FIG. 3 schematically shows the electrical wiring configuration for the assembly 10. The configuration features a logic means such as a programmable logic controller 75. Various generally known programmable logic controllers are suitable for use with the inventive assembly. For example, it has been found that a Series One Junior Programmable Controller manufactured by the General Electric Company functions well. Proximity sensors 40A, 40B, 50A, 50B, 60A, and 60B, which include the above discussed electrodes, are wired to indicate to the controller 75 the position of the window 12 as discussed above. The controller 75 is in turn connected through a relay 77 with motors 18 and 28. Additionally, motor speed controllers 78 and 79, such as for example, rheostats, are connected to the relay 77. In this manner, the controller 75 acts through relay 77 to route current to the motors 18 and 28 through the speed controllers 78 and 79. This enables the controller to selectively control the motors to move the window 12 at varying speeds.

A typical operation of the configuration, therefore, includes a user operating an up-down switch 76 which is connected to the controller 75. In response to the switch 76 being operated by a user to raise the window 12, the controller 75 is programmed in a known manner to route current to the motor 18 through a selected speed controller 78 or 79 via the relay 77. Accordingly, by the user appropriately operating the switch 76, the window can be raised.

A target (not shown) is arranged on the carriage 16 so that as the motor 18 raises the carriage 16, the target approaches the electrode 60B. When the window 12 is raised to the point that the target on the carriage 16 is proximal to the electrode 60B, the capacitance change of the electrode 60B will signal to the controller 75 to route current to the motor 28 to begin extending the window 12 toward its flush position. Simultaneously, the controller 75 routes current to the motor 18 through a different speed controller 79 or 78 to cause the motor 18, and hence the assent of the window 12, to slow down. The motor 18 remains energized until a target (not shown) on the carriage 16 is proximal to the electrode 40B indicating that the window has been completely raised into the space S. The controller 75, however, will continue to route current to the motor 28 until electrode 50B is proximal to a target (not shown) located on the underside of window sash 30 indicating that the window is in its flush position.

The process of lowering the window 12 operates similarly to the process of raising the window 12. When an individual operates the switch 76 to lower the window 12, the controller 75 will route current to motor 28 to begin withdrawing the window 12. When the electrode 50A becomes proximal to a target (not shown) located on the underside of the window sash 30, the controller 75 is signalled to shut off the motor 28. Simultaneously with the withdrawal of window 12, the controller 75 will also route current to motor 18 through relay 77 at its main speed to begin lowering the window 12. Lowering of the window 12 continues until electrode 40A becomes proximal to a target located on the carriage 16 indicating to controller 75 that the motor 18 should be shut off.

In another embodiment of the invention, proximity sensors 60A and 60B are eliminated by programming the controller 75 so that current is routed to the motor 28 upon the window 12 reaching the uppermost limit of its path. In this manner, the window 12 is raised all the way up into space S before being extended outwardly to its flush position. Similarly, the controller can be programmed so that the first step in lowering the window 12 is to route current to the motor 28 until electrode 50A indicates that the window 12 is entirely withdrawn. The controller 75 could then route current to the motor 18 to lower the window.

As noted above, however, it may be desirable to initiate the withdrawal or extension cycle of the window 12 at a position other than the uppermost point of the window's travel. Accordingly, electrodes 60A and 60B are provided, in some embodiments, along with appropriately arranged targets on the carriage 16.

The controller 75 continuously monitors the sequence of movement of the window 12 so that motion of the window 12 can be stopped at any point between raising and lowering the window. Known circuitry is provided so that the controller 75 maintains its integrity even when power is interrupted.

The sequence of withdrawing and extending the window 12 in relation to its being raised and lowered can be easily altered. By arranging the electrodes 60A and 60B and the respective targets mounted on the carrier 16, the assembly 10 can be configured so that the window starts moving outward before or after it reaches the top of its travel. Additionally, the system can be configured so that the window 12 reaches the upward and outward limits of its path of travel simultaneously.

Similarly, the assembly 10 can be configured through adjustment of electrodes 60A and 60B and their respective targets so that controller 75 routes current to motor 28 to begin inward movement of the window 12 simultaneously with or before the window 12 begins to move downward. The appropriate positioning of the electrodes 60A and 60B to achieve the above-described effects will be generally known to those in the art.

Figure 4:
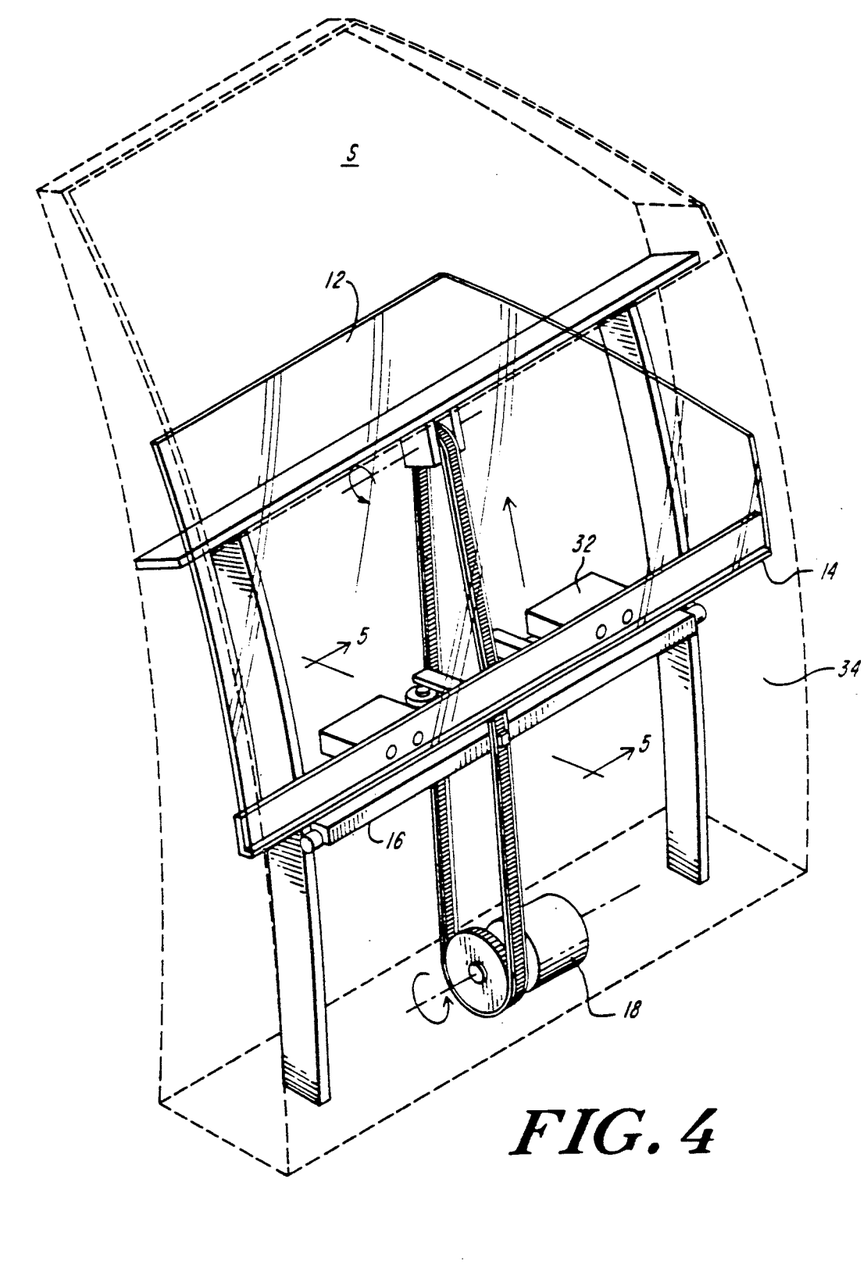
FIG. 4 is a perspective view of the assembly shown in FIG. 1, the window being positioned part way between its entirely raised and its entirely lowered positions.

The various positions of the window are shown in FIGS. 4 through 9. In particular, FIGS. 4 and 5 show the assembly 10 wherein the window 12 is positioned part way between its completely lowered position and its completely raised position. When so disposed, as indicated by arrows 19, the motor 18 acts to drive the sprocket 26 and, in the illustrated embodiment, the belt 22 to move the window 12 either upward or downward. For the purposes of explanation, the movement of the window from this point will be further described as ascending to its fully raised and flush position.

Figure 6:
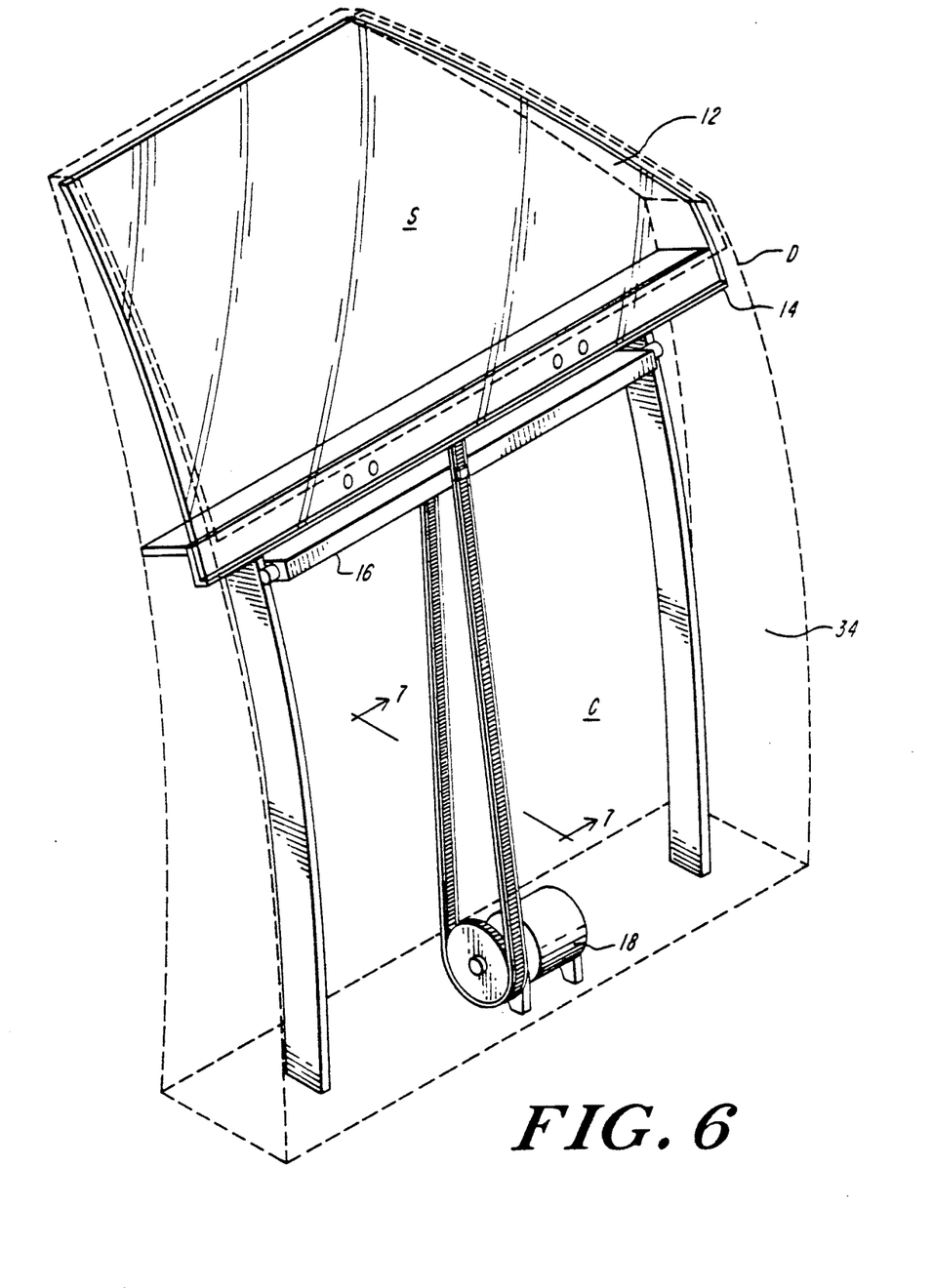
FIG. 6 is a perspective view of the assembly shown in FIG. 1, the window being positioned in its raised and withdrawn position.

FIGS. 6 and 7 show the assembly 10 wherein the window 12 is positioned in its fully raised position. The window 12, however, is still in its withdrawn position so that, as illustrated, it is not flush with the outer surface 34 of the motor vehicle body. Again, as discussed above, the electrodes 60A and 60B can be arranged for varying the sequencing of the window movements. As shown in FIGS. 6 and 7, however, the switches have been arranged so that the controller 75 allows the window 12 to reach its completely raised position before routing current to motor 28 to extend the window 12.

Figure 8:
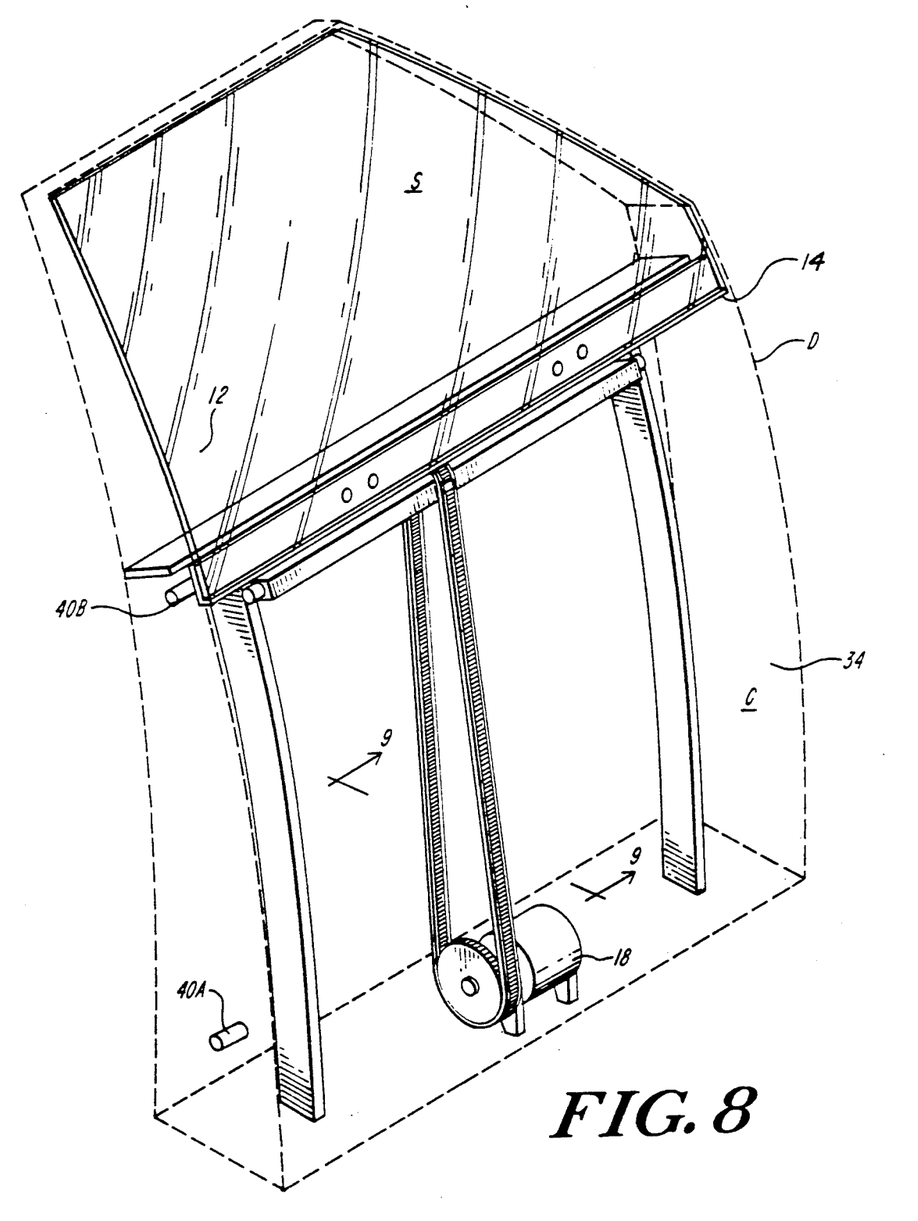
FIG. 8 is a perspective view of the assembly shown in FIG. 1, the window being shown in its raised and flush position.
Figure 9:
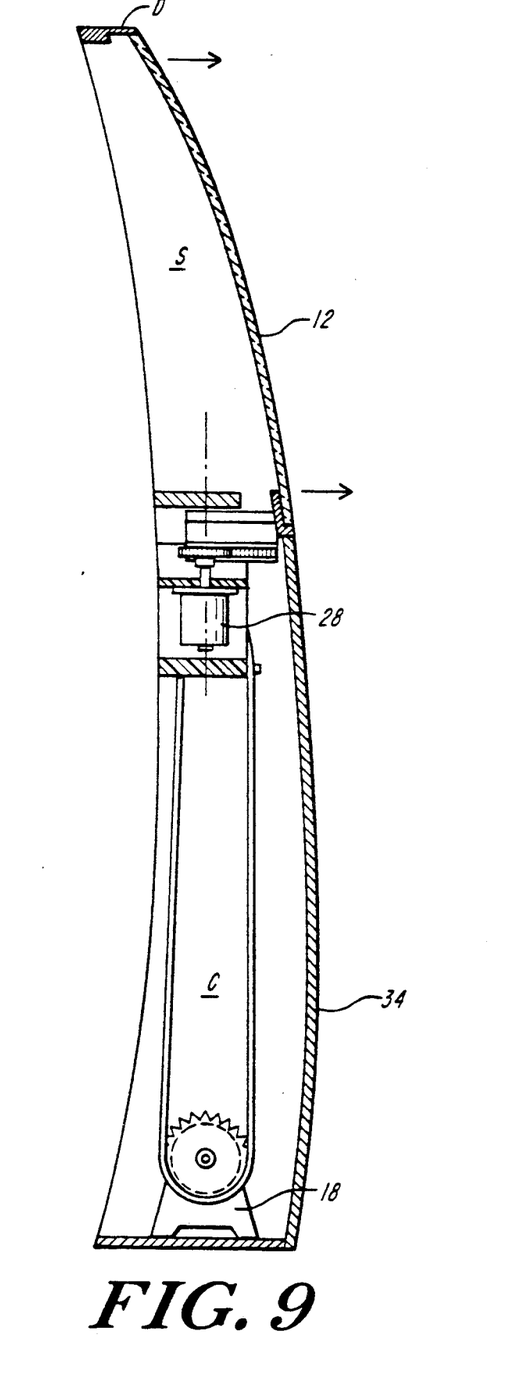
FIG. 9 is a sectional view taken along line 9—9 of FIG. 8.

FIGS. 8 and 9 show the window 12 in its completely raised and flush position. As represented by arrow 29, the controller 75 has now routed current to the motor 28 in order to drive the gear 36 so that the window 12 is displaced, via bracket 14 being connected to block gear 38, to a position wherein it is aligned to be flush with the outer surface 34 of the motor vehicle body.

As stated, the electrodes 40A, 40B, 50A, 50B, 60A, and 60B, can be arranged in a known manner to control the sequencing of the motors 18 and 28. Depending, therefore, on the geometry of the window 12 and the motor vehicle body D, an assembly can be configured for most efficiently moving the window 12 from a position wherein it is located entirely within the cavity C to a position wherein it is located in the window space S and flush with the outer surface 34 of the motor vehicle body.

It should be understood, therefore, that various alterations to the above-described embodiments will be readily apparent to those skilled in the art yet remain within the spirit and scope of the invention. Accordingly, the invention is to be defined, not by the preceeding description, but by the claims that follow.

What is claimed is:

1. A sliding window assembly for moving a window between a cavity defined by a structure having an outer surface, and a space located above the cavity, the assembly comprising
    a first motor for selectively moving the window between the cavity and the space,
    a second motor for selectively moving the window between a first position substantially aligned with the cavity and a second position substantially aligned with the outer surface,
    first sensing means for indicating when the window is substantially entirely within the cavity and when the window is substantially entirely within the space,
    second sensing means for indicating when the window is in said first position and when the window is in said second position, and
    logic means connected to said first and second sensing means for controlling said first and second motors.

2. An assembly as set forth in claim 1 further comprising third sensing means for indicating to said logic means when the window is in a selected position for said logic means to control said second motor to move the window between said first and second positions.

3. An assembly as set forth in claim 2 wherein said first, second, and third sensing means comprise pairs of capacitance proximity sensors arranged in the cavity and connected to said logic means.

4. An assembly as set forth in claim 1, wherein said first motor is stationarily mounted to the structure within the cavity and said second motor moves relative to the movement of the window between the cavity and the space.

5. An assembly as set forth in claim 1 wherein said logic means controls said first motor to move the window at varying speeds.

6. A sliding window assembly for moving a window between a cavity defined by a structure having an outer surface, and a space located above the cavity, the assembly comprising
   a carriage disposed within the cavity for carrying the window,
   a first motor coupled to the carriage for moving the carriage to selectively position the window in the cavity or in the space,
   a second motor mounted on the carriage and coupled to the window for selectively moving the window between a first position substantially aligned with the cavity and a second position substantially aligned with the outer surface,
   first sensing means for indicating when said carriage is disposed so as to position the window substantially entirely within the cavity and when said carriage is disposed so as to position the window substantially entirely within the space,
   second sensing means for indicating when the window is in said first position and when the window is in said second position, and
   logic means connected to said first and second sensing means for controlling said first and second motors.

7. An assembly as set forth in claim 6 further comprising third sensing means for indicating to said logic means when the window is properly positioned for said logic means to control said second motor to move the window between said first and second positions.

8. An assembly as set forth in claim 7 wherein said first, second, and third sensing means comprise pairs of capacitance proximity sensors arranged in the cavity and connected to said logic means.

9. An assembly as set forth in claim 7 wherein said logic means controls said first motor to move the window at varying speeds.

10. A sliding window assembly for moving a window between a cavity defined by a structure having an outer surface, and a space located above the cavity, the assembly comprising
    a carriage disposed within the cavity for carrying the window,
    a first motor mounted within the cavity,
    a belt coupling the carriage to the motor so that the motor is operable to selectively position the window in the cavity or in the space,
    a second motor mounted on the carriage and coupled to the window for selectively moving the window between a first position substantially aligned with the cavity and a second position substantially aligned with the outer surface,
    first sensing means for indicating when said carriage is disposed so as to position the window substantially entirely within the cavity and when said carriage is disposed so as to position the window substantially entirely within the space,
    second sensing means for indicating when the window is in said first position and when the window is in said second position,
    logic means connected to said first and second detection means for controlling said first and second motors,
    third sensing means mounted on said platform and connected to said logic means for indicating to said logic means when the window is properly positioned for said logic means to control said second motor to move the window between said first and second positions.

11. An assembly as set forth in claim 10 wherein said first, second, and third sensing means comprise pairs of capacitance proximity sensors arranged in the cavity and connected to said logic means.

12. An assembly as set forth in claim 10 wherein said logic means controls said first motor to move the window at varying speeds.

* * * * *